United States Patent Office 3,259,237
Patented July 5, 1966

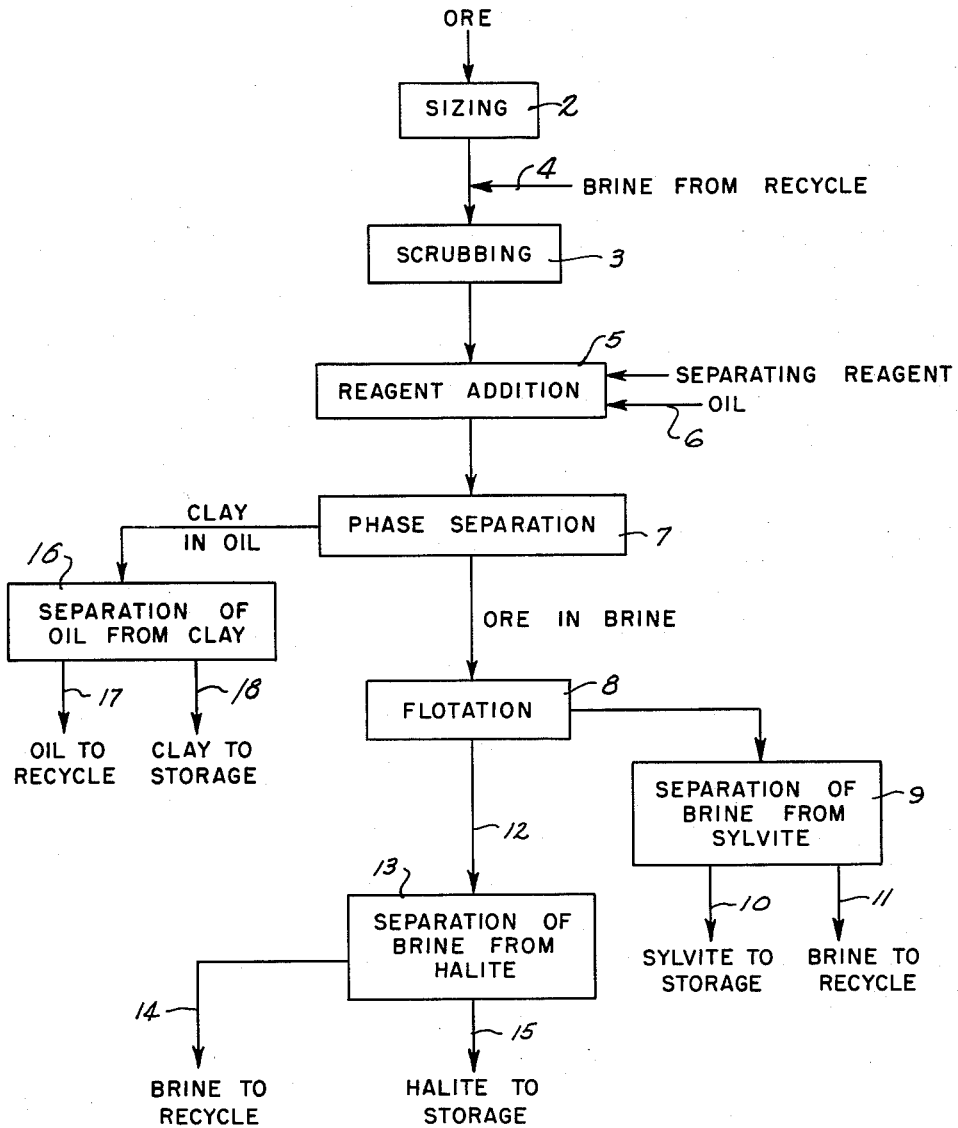

3,259,237
PHASE DESLIMING AND CONCENTRATION
OF POTASH ORES
Edmund A. Schoeld and Clarence W. Egbom, Carlsbad,
N. Mex., assignors to Potash Company of America,
Carlsbad, N. Mex., a corporation of Colorado
Filed Apr. 22, 1963, Ser. No. 274,405
7 Claims. (Cl. 209—9)

This invention relates to a method of separating clay constituents and slimes from sylvinite ores prior to the flotation of sylvite.

The desliming of sylvinite ores is essential in the flotation process which utilizes cationic fatty amine collectors as otherwise the clay constituents absorb amine collectors to an extent that makes the process uneconomical. Polysaccharides, natural and synthetic gums and resins are used to reduce the collector requirement by providing a surface barrier on the clay against amine absorption. However, the most economical operation has been found to be rather thorough desliming to eliminate most of the clay content thereby allowing minimum clay blinding reagent and amine collector use.

Desliming is conventionally performed in devices such as hydroseparators, cyclones and classifiers. Thorough desliming in this type equipment results in the loss of much valuable ore passing with the clay discharge in the form of "fines"; or, if a sharper separation of clay and ore is desired, large volumes of brine are required with increased installation and handling costs. Economical operation dictates the recovery of the valuable sylvite from the "fines." In prevailing practice, this also requires large brine volumes and additional equipment, in which the clay is decanted from the salts. The clay is subsequently delivered to a thickener in the form of a very light density slurry in brine and the clay is allowed to settle. The settled clay bed will normally have a density of only 4 to 5% solids, if the salts have been removed. Thus, it can be readily seen that a major disadvantage in this method is the large brine volumes that must be handled and also the brine volumes that must be discarded with the clay. Such losses must be made up in the circuit by the addition of water and the solution of valuable constituents in the ore.

Therefore, it is a principal object of this invention to provide an economical method of removing slimes efficiently from the sylvinite ore and to perform the removal and discard of these slimes without excessive brine loss.

Another object of our invention is to render the clays in an ore charge being prepared for flotation both hydrophobic and organophilic for their separation and removal in an oil phase of relatively small volume.

Briefly stated, our invention comprises the treatment of the liberated clay constituents from an ore having clay contaminants such as sylvinite ore with a surface active agent which is attracted to the clay and as a result renders the clay dispersible in organic media. The organic fluid containing the slimes, being immiscible with the aqueous phase, is easily and efficiently separated leaving a clean pulp ready for flotation conditioning.

The preliminary ore preparation may be identical with past processes. The ore is crushed and sized dry or may be sized in a wet screening operation. After sizing, the ore is mixed with brine, saturated with respect to the soluble constituents of the ore. This pulp, of 50 to 60% solids, is scrubbed to liberate slimes from the crystal surfaces. At this point, the surface active agent is added and allowed to adsorb on the clay. The immiscible organic fluid, introduced into this reagentized pulp in small volume, will selectively pick up the coated slimes particles. Under quiet conditions the phases will divide and the slimes are removed on separation of the phases.

The organic fluid can be recovered by decantation after a settling period or after centrifuging to high density. Residual fluid after such treatment may be fully recovered by distillation.

The clay constituents of the insoluble material associated with sylvinite ore are hydrophilic in character. As such, they are not compatible with organic systems. However, recent developments in the treatment of clays and finely divided mineral particles have brought to light agents capable of producing clays which exhibit organophilic characteristics. Many applications in the use of coated clays and other mineral materials have been disclosed. The treatment is particularly useful in the dispersion of clays and pigments in organic liquids used as coatings. Treated clays are also widely used as fillers in certain plastics, such as polyurethane foams and polyester resins. Further applications are as fillers for rubber and printing ink formulations.

The agents generally used to modify clay and other mineral surfaces are the catinoic types and those described as nonionic, but which are attracted to the mineral surface. The hydrophilic portion of the molecule attaches to the mineral leaving the hydrophobic portion as a new "surface" and gives the particles the organophilic property. Some of the agents used successfully in the treatment of the sylvinite ore insolubles include certain amines and amine salts, quaternary ammonium compounds, ethylene oxide condensates with alkyl phenol, ethylene oxide adducts with fatty acids, amines and amides and esters of fatty acids with polyhydric alcohols.

We may use fatty amines and fatty amine salts, but such amines tend to attach to sylvite surfaces also and result in fine sylvite being extracted with the clay. Other amines, such as the acetate salt of a rosin amine, however are selectively attracted to the clay constituents and are useful in this invention.

The polyethoxylated amines from coco, soybean and tallow amines are effective agents alone and highly effective in combination with quaternary amine compounds. These reagents have been described as particularly useful in the dispersion of pigments in paint. The ethylene oxide condensate with nonylphenol is an example of an effective nonionic reagent. The reagent should preferably contain from 5 to 8 mols of ethylene oxide.

The organic fluid into which the treated clay is incorporated may be any oil, solvent or other organic liquid immiscible with water or brine. Properties of certain organic liquids appear to influence the extraction method in different ways. For example, benzene was not as desirable as n-heptane due to the tendency to form emulsions difficult to separate with the reagents described. This may be partially the consequence of poorer compatibility of reagent and solvent and also a difference in interfacial tension between the various solvents against the brine phase.

These examples are intended to serve as illustrations of preferred reagents and it will be readily apparent to anyone skilled in the art that any reagent which will coat clay minerals and render them organophilic is within the scope of this invention.

The practice of the invention will now be described with reference to the accompanying drawing, in which the single view is a flow sheet of a typical plant installation. As shown, dry sylvinite ore from a suitable source, and ground to flotation size, is subjected to a sizing step at 2 to eliminate oversize and the extreme fines containing substantially all of the clay slimes pass with the ore charge to a scrubbing stage 3 with brine introduced as shown at 4. The brine is saturated with respect to the soluble constitutents of the ore and preferably is introduced in a quantity to produce a pulp of from 30% to 60% solids but preferably between 50 and 60% solids. The scrubbing action serves to liberate slimes from crystal surfaces and make the entire slimes content available for separation by the process.

Following scrubbing, the ore is mixed with reagent and thereby agitated at stage 5 to render the clay organophilic and an oil or other organic liquid immiscible with brine is introduced at 6 for mixing in stage 5 so as to produce an organic fluid.

The surface active agent requirements are dependent on the quantity and type of clay constituents present in the ore to be treated and can, therefore, vary over a wide range. The best results are obtained with 0.05 to 0.25% based on the ore weight. Insufficient reagent results in the formation of a sticky emulsion of the clay materials and the organic liquid which is difficult to remove from the pulp and also leads to the loss of fine sylvite and of the organic liquid itself. The organic liquid volume requirement with respect to the quantity of pulp may vary from 1 to 4 volumes per 50 volumes of pulp.

The reagentized ore from stage 5 is subjected to phase separation at stage 7 with the immiscible organic solution containing essentially all the clay being separated from the ore in all sizes. The ore charge after such separation is conditioned for flotation by pulping and mixing with collector reagents such as an amine-oil mixture of the type well known in sylvite flotation. The conditioned ore in the brine carrier is fed to a flotation stage 8 which may comprise one or a series of cells. The sylvite in all sizes concentrates in a froth which is collected and subjected to dewatering and drying procedures well known in the art and collectively represented by a separation stage 9 in the flow sheet. Dried sylvite is discharged at 10 as a final product and the separated brine is collected as represented at 11 for recycling to brine introduction stages of the treatment.

The flotation tailings are conducted by a line 12 to dewatering treatments of any suitable type and collectively represented by a separation stage 13 from which separated brine is taken for recycling as indicated at 14 while the halite so separated is passed to storage or waste as shown at 15.

The clay in oil removed at stage 7 is subjected to separation for recovery and reuse of the oil as represented by separation stage 16. The oil after separation is conducted by a line 17 to a processing stage (not shown) or may be connected to line 6 as the oil supply to stage 5. The separated clay from stage 16 is discharged to storage or waste.

To illustrate the advantages and efficiency of the procedure just described, the results of typical tests will be cited.

*Test No. 1*

A sample of a sylvinite ore was sized to −14 mesh. The ore contained about 5% total insoluble matter. Scrubbing in brine was carried out to release all of the exposed clay constituents. A mixture containing 80% dicoco, di-methyl ammonium chloride and 20% ethoxylated tallow amine was added to this pulp at the rate of 0.25%, based on the weight of ore. One part of n-heptane was stirred into 25 parts of this slurry. The phases were then allowed to separate a few minutes and the oily layer overflowed. Another addition of one part heptane to 50 parts slurry was made to further clean the pulp. The pulp was partially dewatered and conditioned with 0.5 lb. starch, 0.25 lb. amine and 0.1 lb. methylisobutylcarbinol per ton of ore. The flotation results are as follows:

|  | Weight, percent | Percent KCl | Parts KCl | Percent KCl Distribution |
|---|---|---|---|---|
| Slimes | 4.6 | 3.8 | 0.175 | 0.4 |
| Concentrates | 50.4 | 95.1 | 47.93 | 98.4 |
| Tailings | 45.0 | 1.3 | 0.585 | 1.2 |

*Test No. 2*

In another example, a rosin amine acetate solution was added at the rate of 0.25% based on the weight of ore and the organic fluid was a standard type solvent. The ore used in this example contained about 1% total insoluble matter. After desliming by extraction, the clean pulp was conditioned with 0.5 lb. starch, 0.2 lb. amine and 0.1 lb. methylisobutylcarbinol per ton of ore. The flotation results are as follows:

|  | Weight, percent | Percent KCl | Parts KCl | Percent KCl Distribution |
|---|---|---|---|---|
| Slimes | 2.0 | 16.2 | 0.32 | 0.8 |
| Concentrates | 39.0 | 93.2 | 36.35 | 94.1 |
| Tailings | 59.0 | 3.3 | 1.95 | 5.1 |

*Test No. 3*

A further example is presented in which the extraction desliming was performed prior to the flotation of a coarse sylvite ore. The ore was sized to −6 +14 mesh and contained between 4 and 5% insoluble matter. The ore was thoroughly scrubbed as in the previous examples. The quaternary amine-ethoxylated amine mixture was used to treat the clay at 0.25% of the weight of the core. The clay was extracted with n-heptane. After dewatering the ore to about 85% pulp density, it was conditioned with 0.2 lb. amine and 1.2 lb. flotation oil per ton of ore. The flotation results are as follows:

|  | Weight, percent | Percent KCl | Parts KCl | Percent KCl Distribution |
|---|---|---|---|---|
| Slimes | 4.65 | 1.0 | 0.45 | 1.0 |
| Concentrates | 44.65 | 95.8 | 42.77 | 94.3 |
| Tailings | 50.70 | 4.2 | 2.13 | 4.7 |

*Test No. 4*

To further illustrate the desliming efficiency of the extraction method, the following examples are presented. Conventional desliming results were obtained by backwashing 200 gram batches of scrubbed ore with 900 to 1000 ml. of brine at rates similar to actual plant operations. The extraction results were accomplished with 0.5 gram of clay reagent and 20 ml. of Stoddard Solvent for the same size ore sample.

| Reagent | Weight percent | | Percent Insol in— | |
|---|---|---|---|---|
|  | Slimes | Deslimed Ore | Slimes | Deslimed Ore |
| None (Conventional) | 7.5 | 92.5 | 9.5 | 0.31 |
| Do | 8.9 | 91.1 | 8.0 | 0.28 |
| Arquad 2C-Ethomeen T/15 [1] | 0.75 | 99.25 | 70.2 | 0.28 |
| Renex 697 [2] | 1.25 | 98.75 | 40.4 | 0.28 |
| Ethomid 0/15 [3] | 1.45 | 98.55 | 40.9 | 0.22 |
| Polyethylene Glycol Mono Oleate | 3.35 | 96.65 | 24.3 | 0.23 |

[1] Dicoco-di methyl ammonium chloride and the reaction product of ethylene oxide (5 mols) with tallow amine (from Armour).
[2] Reaction product of ethylene oxide (6 mols) with nonylphenol (from Atlas Powder Co.).
[3] Reaction product of ethylene oxide (5 mols) with oleyl amide (from Armour Chemical Co.).

It is readily seen that fine salts are largely rejected by the oil system resulting in reduced losses to the slimes, with as good or better clay removal by the extraction method and involving greatly reduced volumes of material to be handled.

From the foregoing description and illustrations, it will be apparent that a variety of materials may be selected in forming the brine-immiscible oily phase reagent combination and efficient desliming can be attained by circulating only a small volume of material. For example, effective clay removal has been obtained using 160 pounds of oil per ton of ore. Comparatively, conventional brine desliming operations will require about 3.8 tons of brine per ton of ore. Changes and modifications of treatment steps and procedures may be availed of within the scope of our invention as defined in the hereunto appended claims.

We claim:

1. In a method of preparing sylvinite ore having halite and sylvite components and clay slimes contaminants for ore dressing treatments, the steps of forming a slurry of the sylvinite ore charge in a brine carrier which is a saturated NaCl-KCl solution, subjecting the slurry to a scrubbing action for liberating the slimes, introducing a surface active reagent into said slurry passing from said scrubbing action in a quantity which renders the clay hydrophobic and oleophilic without rendering the sylvite oleophilic, at a next stage introducing an oil carrier into the brine containing the clay so treated and agitating the resulting oil and brine mixture, said oil being introduced in a quantity sufficient to form an upper phase of oil and clay and a lower phase of ore and brine, allowing the oil and clay in the brine to separate into an upper phase of oil and clay and a lower phase of ore and brine, and removing the upper phase of oil and clay from the lower phase of ore and brine.

2. A method as defined in claim 1 in which the slurry of the sylvinite ore charge comprises from about 30 to 60% solids.

3. A method as defined in claim 1, in which the surface active agent is dicoco-dimethyl ammonium chloride and the reaction product of ethylene oxide with tallow amine.

4. A method as defined in claim 1, in which the surface active agent is the reaction product of ethylene oxide with nonylphenol.

5. A method as defined in claim 1, in which the surface active agent is the reaction product of ethylene oxide with oleyl amide.

6. A method as defined in claim 1 in which the oil is carrier is recycled to the oil introduction stage after separation of the clay therefrom.

7. In a method of preparing sylvinite ore having halite and sylvite components and clay slimes contaminants for ore dressing treatments, the steps of forming a slurry of the sylvinite ore charge in a brine carrier which is a saturated NaCl-KCl solution, subjecting the slurry to a scrubbing action for liberating the slimes, introducing a surface active reagent into said slurry passing from said scrubbing action in a quantity which renders the clay organophilic with out rendering the sylvite oleophilic, introducing an oil carrier into the brine containing the clay so treated and agitating the resulting oil and brine mixture, said oil being introduced in a quantity sufficient to form an upper phase of oil and clay and a lower phase of ore and brine, allowing the oil and clay in the brine to separate into an upper phase of oil and clay and a lower phase of ore and brine, and removing the upper phase of oil and clay from the lower phase of ore and brine.

References Cited by the Examiner

UNITED STATES PATENTS

| 2,564,546 | 8/1951 | Scheu | 209—166 |
| 2,663,650 | 12/1953 | Iler | 106—308 |
| 2,923,408 | 2/1960 | Williams | 209—166 |
| 2,971,922 | 2/1961 | Clem | 106—308 |
| 3,020,231 | 2/1962 | Colwell | 209—5 |
| 3,037,624 | 6/1962 | Jackson | 209—3 X |
| 3,095,282 | 6/1963 | Wilson | 209—5 |

FOREIGN PATENTS 1,083,192  6/1960  Germany.

HARRY B. THORNTON, *Primary Examiner.*

HERBERT L. MARTIN, *Examiner.*

R. HALPER, *Assistant Examiner.*